United States Patent
Nitzpon et al.

(10) Patent No.: US 7,649,277 B2
(45) Date of Patent: Jan. 19, 2010

(54) METHOD FOR THE OPERATION OF A WIND ENERGY PLANT WITH A SYNCHRONOUS GENERATOR AND A SUPERIMPOSITION GEARBOX

(75) Inventors: Joachim Nitzpon, Hamburg (DE); Thomas-Paul Woldmann, Hamburg (DE)

(73) Assignee: Nordex Energy GmbH, Norderstedt (DE)

( * ) Notice: Subject to any disclaimer, the term of this patent is extended or adjusted under 35 U.S.C. 154(b) by 24 days.

(21) Appl. No.: 11/844,149

(22) Filed: Aug. 23, 2007

(65) Prior Publication Data
US 2008/0054643 A1 Mar. 6, 2008

(30) Foreign Application Priority Data
Aug. 31, 2006 (DE) .................. 10 2006 040 929

(51) Int. Cl.
*F03D 9/00* (2006.01)
*H02P 9/04* (2006.01)
(52) U.S. Cl. .................................. 290/55; 290/44
(58) Field of Classification Search ........ 290/44, 290/55; 416/132 B, 7; 60/398; 415/4.5, 415/2.1
See application file for complete search history.

(56) References Cited

U.S. PATENT DOCUMENTS

| | | | | |
|---|---|---|---|---|
| 2,329,675 A | * | 9/1943 | Albers | 290/4 R |
| 4,204,126 A | * | 5/1980 | Diggs | 290/55 |
| 4,556,801 A | * | 12/1985 | Gervasio et al. | 290/44 |
| 5,476,293 A | * | 12/1995 | Yang | 290/4 C |
| 6,998,723 B2 | * | 2/2006 | Kong et al. | 290/1 C |
| 7,081,689 B2 | * | 7/2006 | Tilscher et al. | 290/44 |
| 7,259,471 B2 | * | 8/2007 | Basteck | 290/43 |
| 2003/0049128 A1 | * | 3/2003 | Rogan | 416/131 |
| 2007/0024058 A1 | * | 2/2007 | McClintic | 290/44 |
| 2007/0036655 A1 | * | 2/2007 | Damgaard et al. | 416/170 R |
| 2007/0057515 A1 | * | 3/2007 | Daniels | 290/44 |
| 2007/0194575 A1 | * | 8/2007 | Wu | 290/55 |
| 2008/0296897 A1 | * | 12/2008 | Kovach et al. | 290/44 |

FOREIGN PATENT DOCUMENTS

| | | |
|---|---|---|
| DE | 1 283 359 A1 | 10/2001 |
| DE | 103 61 443 A1 | 7/2005 |
| DE | 103 57 292 A1 | 8/2005 |
| JP | 60081473 A * | 5/1985 |

OTHER PUBLICATIONS

Overview Article by P. Caselitz et al, "Drehzahlvariable Windkraflanlagen mit elektrisch geregeltem Uberlagerungsgetriebe", Konferenzband DEWEK 92, pp. 171-175. Statement of Relevancy attached.

* cited by examiner

*Primary Examiner*—Julio Cesar Gonzalez
(74) *Attorney, Agent, or Firm*—Vidas, Arrett & Steinkraus, P.A.

(57) ABSTRACT

A method for the operation of a wind energy plant, with a synchronous generator, a superimposition gearbox, which is connected between rotor shaft and generator shaft, and a drive unit, wherein before connecting the synchronous generator to the electric grid, the drive unit drives the synchronous generator until the same has reached its rated rotational speed.

10 Claims, 2 Drawing Sheets

METHOD FOR THE OPERATION OF A WIND ENERGY PLANT WITH A SYNCHRONOUS GENERATOR AND A SUPERIMPOSITION GEARBOX

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a method for the operation of a wind energy plant with a synchronous generator and a superimposition gearbox.

From an overview article "Drehzahlvariable Windkraftanlagen mit elektrisch geregeltem Überlagerungsgetriebe" by P. Caselitz et al., Konferenzband "DEWEK '92", p. 171-175, the entire contents of which is incorporated herein by reference, the use of electrically controlled superimposition gearboxes for the rotational speed variable operation of wind energy plants is put forward. Caselitz et al. point out that in this conception, the rotational speed variability is not realised in the electric part, but in the mechanical part of the plant. For this purpose, a superimposition gearbox is provided, which is also used for power branching, for instance. The superimposition gearbox has a third shaft, by which the gear ratio between rotor and generator can be varied. The relation between the rotational speeds of the three shafts can be summarised as follows:

$$i_1\omega_R - i_2\omega_C - \omega_G = 0,$$

wherein $i_1$ and $i_2$ are gear ratios predetermined by the construction and $\omega_R$ designates the rotational speed of the rotor, $\omega_C$ the rotational speed on the third shaft of the superimposition gearbox and $\omega_G$ the generator rotational speed. For driving the third shaft of the superimposition gearbox, an electric drive is normally used. The use of a power converter fed asynchronous machine with squirrel-cage armature is proposed by Caselitz et al.

From the equation at hand it is directly obvious that at connected generator with constant rotational speed $\omega_G$ a variable rotor velocity $\omega_R$ (t), through changing wind conditions and other boundary conditions for instance, can be compensated by an adaptation of the rotational speed at the third shaft, wherein here, a torque is guided to the generator via the third shaft or is guided from the rotor into the third shaft.

From DE 103 61 443 B4, the entire contents of which is incorporated herein by reference, a wind energy plant is known which has a rotational speed constant, grid-coupled generator. A controller with three controlling levels is provided in order to control the wind energy plant in the partial load region. In the first controlling level, the input shaft of a power-branching gearbox is driven by the wind rotor. In one power branch, a hydrodynamic speed transformer with guide wheel and guide vanes is provided. Further, a reaction member is provided in one power branch, which causes a power reflux to the power-branching gearbox via the other power branch. An improved control in a wind energy plant with a superimposition gearbox is said to be the advantages of this realisation of a wind energy plant.

From DE 103 57 292 B4, the entire contents of which is incorporated herein by reference, a method for controlling a drive train of a wind energy plant with rotational speed guiding is known, wherein the rotational speed guiding takes place via a power-branching gearbox and a hydrodynamic speed transformer with variable-pitch guide vanes. The speed transformer with variable-pitch guide vanes comprises a pump wheel, a turbine wheel and an adjustable reaction member, and rotational speed for the electric generator.

From EP 1 283 359 A1, the entire contents of which is incorporated herein by reference, a wind energy plant with a superimposition gearbox is known. The controlling shaft for the adjustment of the gear ratio on the superimposition gearbox is driven by an electric machine, in order to keep a rotational speed at the generator constant or within a certain range. For this purpose, the electric machine can be driven as a generator and as a motor as well.

The present invention is based on the objective to provide a method for the operation of a wind energy plant, which avoids troubles of the grid and/or an overstress of individual drive train components when connecting the synchronous generator.

BRIEF SUMMARY OF THE INVENTION

The method of the present invention serves for the operation of a wind energy plant with a synchronous generator and a superimposition gearbox. The superimposition gearbox is connected between a rotor shaft and a generator shaft. In addition, a drive unit is provided, by which a torque can be guided from the drive unit to the generator shaft. According to the present invention, before connecting the generator, the same is driven by the drive unit until the generator has reached its rated rotational speed. Only after reaching the rated rotational speed, with the possibly performed fine adjustment of the rated rotational speed, the generator is connected to the grid. In the method of the present invention, a smooth connection takes place in this way, in which strong noise impulses or voltage changes are avoided.

In a preferred embodiment, the drive unit is coupled with the superimposition gearbox. Practically, the drive unit can also serve as a control unit, which takes over the rotational speed/torque regulation in the operation. The superimposition gearbox is linked with the rotor shaft as the input shaft and with the generator shaft as the driven shaft in this realisation, wherein the drive unit can guide a torque to the generator shaft via an additional shaft.

In a preferred extension of the present invention, the rotor stands still during the connection operation. When the drive unit serves also as a control unit and is connected to the third shaft of the superimposition gearbox, then the carrier of the superimposition gearbox is supported on the rotor, so that there is a torque.

In an alternative embodiment, the rotor has a rotational speed different from zero during the connecting process of the generator. As a consequence, there can be a torque on the rotor shaft and through this on the input shaft of the superimposition gearbox. Thus, in this constellation, such an operation management of the wind energy plant takes preferably place in which the rotational speed of the rotor is kept constant. In such an operation management, only the torque lacking to reach the rated rotational speed is provided via the superimposition gearbox by the drive unit, which is also used as a control unit. Alternatively, it is also possible to uncouple the torque applied to the rotor shaft by the generator shaft via the superimposition gearbox, and by doing so to bring the generator to the desired rated rotational speed completely by a drive unit, which is directly coupled on the generator, for instance.

In a preferred embodiment, the rotor stands still during the connecting process. Alternatively, it is also possible that the rotor has a rotational speed different from zero during the connecting process, but runs power-free. In this, such an operation management of the internal combustion engine BKM takes preferably place which controls the rotor in order to keep the rotational speed constant.

In one preferred embodiment, a fine tuning of the generator rotational speed takes place immediately before connecting the generator, which avoids voltage fluctuations in the grid.

BRIEF DESCRIPTION OF THE SEVERAL VIEWS OF THE DRAWINGS

The method of the present invention will be explained in more detail by means of examples in the following.

DETAILED DESCRIPTION OF THE INVENTION

Figure 1:
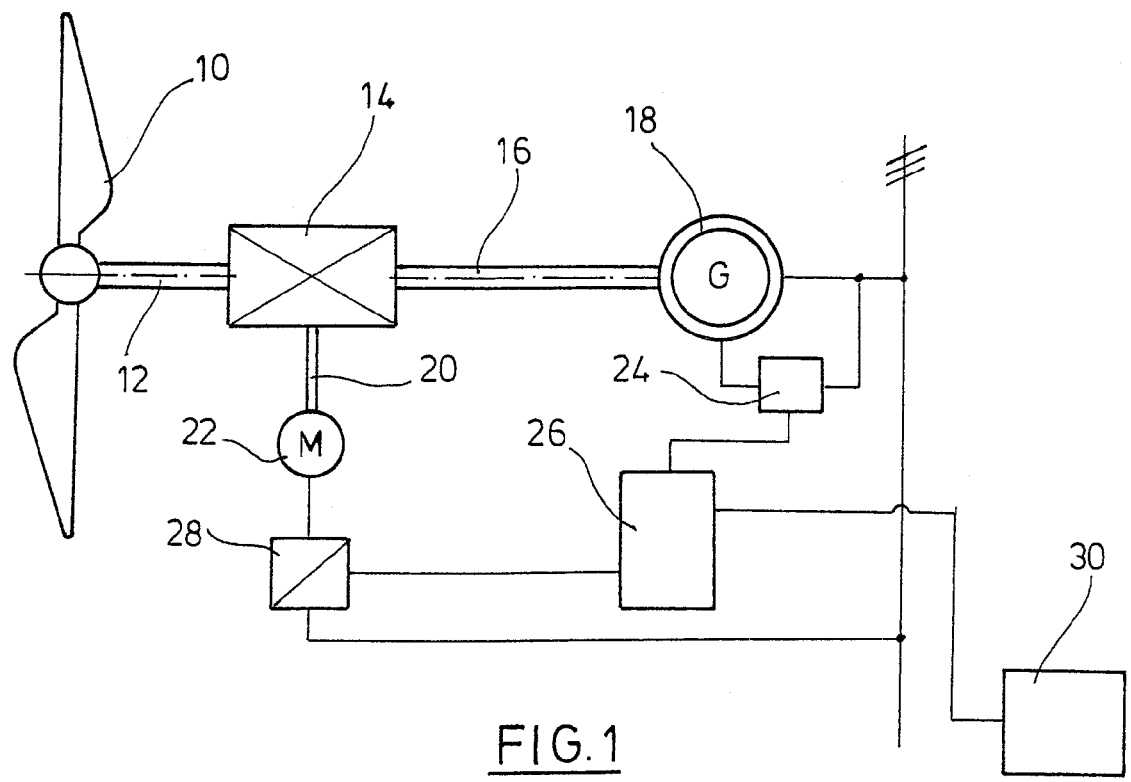
FIG. 1 shows a schematic view of a wind energy plant with superimposition gearbox.

While this invention may be embodied in many different forms, there are described in detail herein a specific preferred embodiment of the invention. This description is an exemplification of the principles of the invention and is not intended to limit the invention to the particular embodiment illustrated FIG. 1 shows a rotor 10, which takes up a torque from the wind. Via its rotor shaft 12, the torque of the rotor 10 is forwarded to a superimposition gearbox 14. The superimposition gearbox 14 has a driven shaft 16, which is coupled to a synchronous generator. The third shaft 20 of the superimposition gearbox 14 is coupled with a motor 22. With respect to the flow of the torques on the superimposition gearbox, we have that the torque applied to the generator is composed from the torque flowing into the superimposition gearbox 14 and the torque of the motor 22 additionally introduced via the third shaft 20, or, in a special case, the torque taken out of the superimposition gearbox 14 via the shaft 20. In the latter realisation, the torque entering the superimposition gearbox is subdivided.

As a generator 18, a synchronous generator is provided, which is connected to an excitation unit 24. Not represented, but possible however, is to provide a direct current intermediate circuit, via which the generated power flows into the grid.

The motor 22 as well as the excitation unit 24 are controlled by a central control unit 26. For instance, the control unit 26 controls a current converter 28 for the motor 22, in order to apply the corresponding moment/torque to the superimposition gearbox 14. In this, motor and current converter are constituent parts of the drive unit. Even the excitation unit 24 for the synchronous generator is driven by the control unit 26. The electric utility, shown schematically as 30, can preset corresponding control signals to the control unit 26.

In the method of the present invention, the synchronous generator 18 is synchronised with the grid before connecting the wind energy plant. For this purpose, the generator shaft is driven by the motor 22 via the superimposition gearbox. In doing so, the rotational speed is increased until the rated rotational speed of the synchronous generator is reached. The rotor 10 supports the third shaft of the superimposition gearbox 14 via the arm. Possibly occurring rotational speed variations do not take place, for instance when the rotor is directly locked and/or directly braked and thus is held fast.

Figure 2:
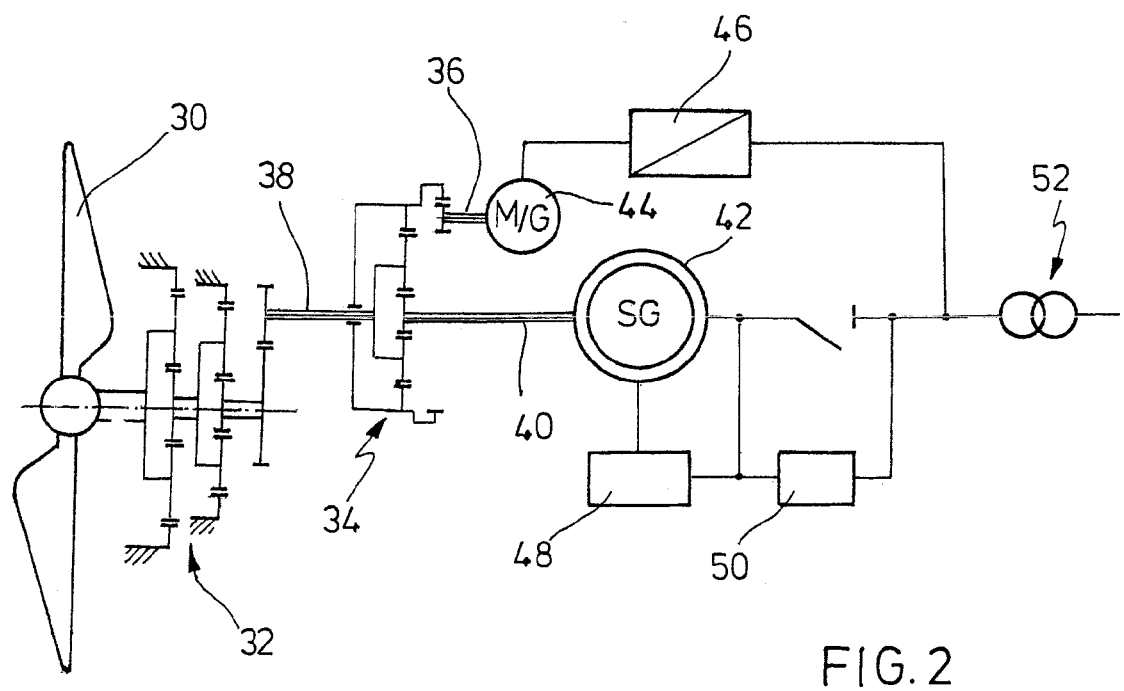
FIG. 2 shows a schematic view of a superimposition gearbox with a grid-supplied drive unit.

FIG. 2 shows a rotor 30 in a schematic view, the shaft of which is coupled to a main gearbox 32. The main gearbox 32 is coupled with the input shaft of a superimposition gearbox 34. The superimposition gearbox 34 has a controlling shaft 36, which is driven by an electric motor 44. The shown superimposition gearbox is made to be a three-shaft planetary gearbox. In this, the driving shaft 38 acts on the planet carrier. The driven shaft 40 corresponds to the sun gear shaft and the hollow wheel of the gearbox to the controlling shaft 36. The driven shaft 40 is connected to a synchronous generator 42 at fixed rotational speed. The controlling shaft is driven by the motor 44, which is controlled by a frequency converter 46. Here, electric motor 44 and frequency converter 46 are component parts of the drive unit. As can be recognised in FIG. 2, the electric motor 44 can also be operated as a generator, so that power is converted into electric power via the controlling shaft 36 on the electric machine 44 and is supplied into the grid via the frequency converter 46. The controlling shaft 36 is supported on the planet carrier shaft in the connecting process of the synchronous generator and it drives the generator 42.

The connecting operation takes place in a controlled manner. In principle, the connecting operation can take place for every deliberate rotational speed. The rotor is maintained moment-free in a rotational speed range by presetting a pitch angle, which depends from the wind velocity and the gust intensity. At strong wind and/or extremely gusty wind, it may be advantageous to keep the rotor braked in the connecting operation of the synchronous generator 42, and to let it run freely only after successful synchronisation. The pitch control must ensure that the drive unit 44 is not overloaded when running up.

In order to connect, a synchronisation unit 50 is provided, which compares grid voltage and generator voltage with each other and drives the frequency converter 46 correspondingly, in order to synchronise generator and grid with each other. The synchronous generator 42 is excited by an excitation unit 48. Synchronisation unit 50 and excitation unit 48 are coupled to the grid.

Figure 3:
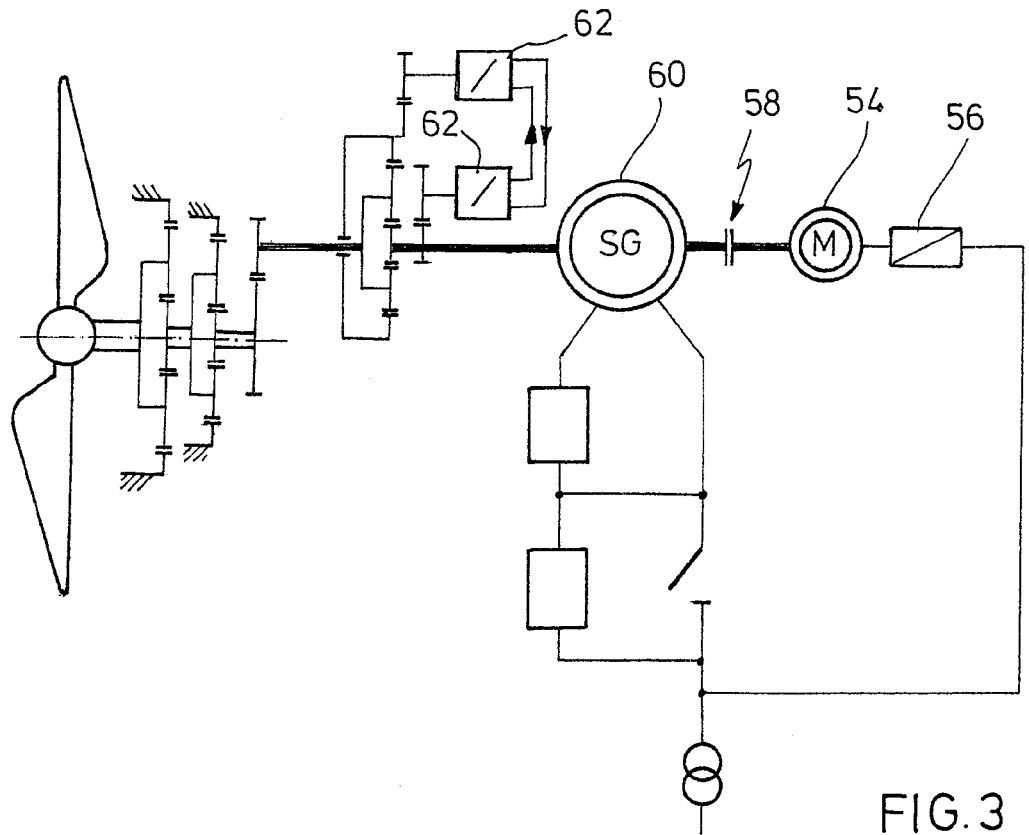
FIG. 3 shows a superimposition gearbox with a hydrostatic converter and an auxiliary motor in connection with the synchronous generator.
Figure 4:
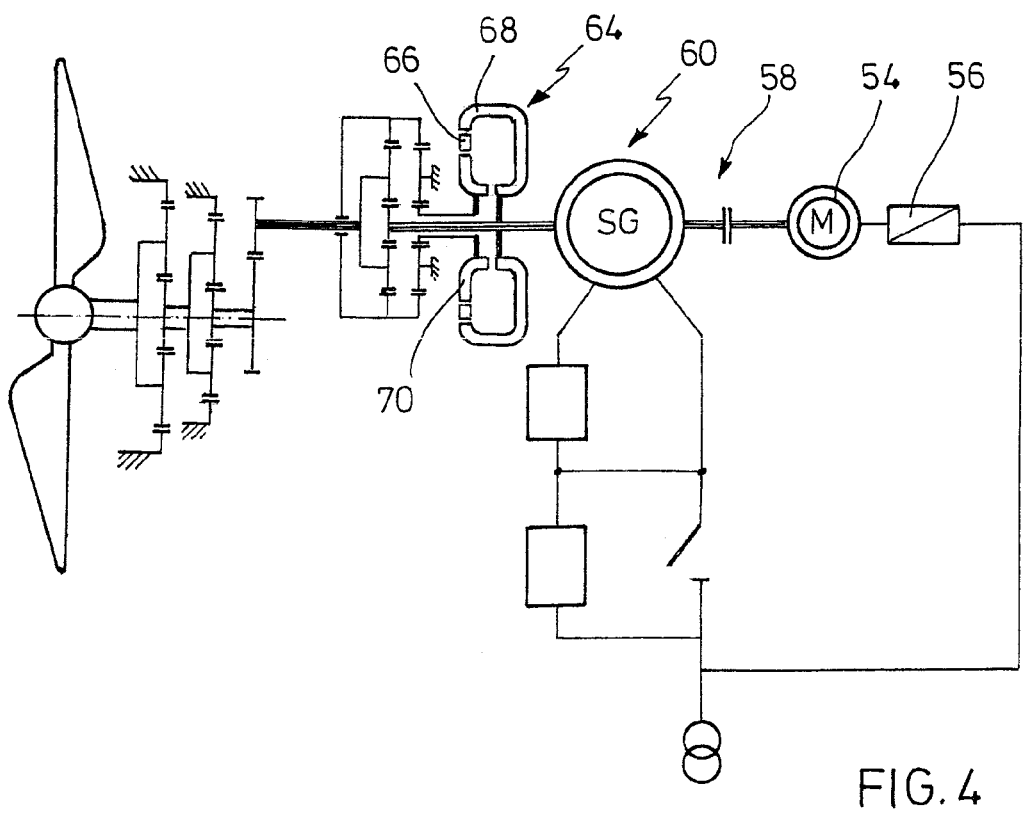
FIG. 4 shows a superimposition gearbox with a hydrostatic converter and an additional auxiliary motor in connection with the synchronous generator

FIGS. 3 and 4 show superimposition gearboxes with a proper control, which permits to work with a constant rotational speed on the generator shaft. The synchronous generator is driven by an auxiliary motor 54, which is controlled by a frequency converter. The auxiliary motor 54 can be an asynchronous motor for instance, which is driven by a rotational speed controlled frequency converter 56. The auxiliary motor 54 is coupled with the generator 60 via a switchable clutch 58. The switchable clutch 58 is closed only for the synchronisation of the synchronous generator 60 and is opened in the operation of the plant (see figure).

In a further embodiment, the clutch is avoided and the auxiliary motor is directly coupled with the synchronous generator via a rigid shaft, and is operated with the synchronous generator completely separated from the grid.

The control of the rotational speed takes place through an hydraulic adjustment drive in FIGS. 3 and 4, which is provided between driven shaft and controlling shaft. FIG. 3 shows an hydrostatic drive, which is controlled to compensate changes of the rotational speed or of the torque on the driving shaft of the superimposition gearbox at constant rotational speed of the driven shaft. For instance, the compensation takes place through the volume flows on the hydrostat 62.

The torque converter 64 shown in FIG. 4 has a guide wheel 66, which provokes a conversion of the rotational speed/torque through its adjustment. Besides to the guide wheel 66, the converter 64 consists of a pump wheel 68 and a turbine wheel 70. For the transmission of power between the driven shaft and the controlling shaft, the converter is filled with oil. The torque applied to the hollow wheel of the superimposition gearbox by doing so permits the power transfer between driving and driven shaft in the superimposition gearbox.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for the operation of a wind energy plant, with a synchronous generator (18), a superimposition gearbox (14), which is connected between rotor shaft (12) and generator shaft (16), and a drive unit, characterised in that before connecting the synchronous generator (18) to the electric grid, the drive unit drives the synchronous generator until the synchronous generator has reached its rated rotational speed,
   the rotor shaft is uncoupled from the generator shaft (16) via the superimposition gearbox, and
   re-coupling the rotor shaft to the generator shaft via the superimposition gearbox to transfer power to the grid after the plant has been connected to the grid.

2. A method according to claim 1, characterised in that the drive unit drives the generator via the superimposition gearbox.

3. A method according to claim 2, characterised in that the drive unit has an electric motor.

4. A method according to claim 1, characterised in that the rotor shafg (12) runs power-free or stands still during the connecting operation of the generator.

5. A method according to claim 1, characterised in that the rotor runs power-free with a rotational speed different from zero during the connecting operation of the generator.

6. A method according to claim 5, characterised in that a control unit of the wind energy plant controls the rotor in order to control the rotor rotational speed.

7. A method according to claim 1, characterised in that the drive unit is controlled to synchronise the voltage generated by the generator with the voltage in the grid, and to keep the generator frequency equal to the grid frequency.

8. A method according to claim 1, characterised in that the drive unit has an auxiliary motor (54), which is coupled to the synchronous generator via a clutch (58).

9. A method according to claim 1, characterised in that the drive unit has an auxiliary motor (54), which is directly coupled to the synchronous generator.

10. A method for connecting a wind energy plant to the grid, comprising the steps of:
   providing a wind energy plant having a synchronous generator (18), a superimposition gearbox (14), which is connected between rotor shaft (12) and generator shall (16), and a drive unit;
   uncoupling the rotor shaft from the generator shaft via the superimposition gearbox;
   driving the synchronous generator until the synchronous generator has reached its rated rotational speed, then
   connecting the synchronous generator (18) to the electric grid, and
   coupling the rotor shaft to the generator shaft via the superimposition gearbox to transfer power to the grid after the plant has been connected to the grid.

* * * * *